US007668728B2

(12) United States Patent  
Jain (10) Patent No.: US 7,668,728 B2
(45) Date of Patent: Feb. 23, 2010

(54) TIME POLYNOMIAL ARROW-DEBREU MARKET EQUILIBRIUM (75) Inventor: Kamal Jain, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 894 days.

(21) Appl. No.: 11/119,362

(22) Filed: Apr. 29, 2005

(65) Prior Publication Data

US 2006/0111951 A1 May 25, 2006

Related U.S. Application Data (63) Continuation of application No. 10/994,182, filed on Nov. 19, 2004, now Pat. No. 7,584,111.

(51) Int. Cl.
G06Q 30/00 (2006.01)

(52) U.S. Cl. .......................................................... 705/1

(58) Field of Classification Search ...................... 705/1
See application file for complete search history.

(56) References Cited

U.S. PATENT DOCUMENTS

| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,179,702 A | 1/1993 | Spix et al. |
| 5,222,205 A | 6/1993 | Larson et al. |
| 5,469,532 A | 11/1995 | Gerlach et al. |
| 5,469,533 A | 11/1995 | Dennis |
| 5,487,138 A | 1/1996 | Rust et al. |
| 5,537,526 A | 7/1996 | Anderson et al. |
| 5,613,124 A | 3/1997 | Atkinson et al. |
| 5,699,493 A | 12/1997 | Davidson, Jr. et al. |
| 5,727,220 A | 3/1998 | Hohensee et al. |
| 5,745,121 A | 4/1998 | Politis |
| 5,745,122 A | 4/1998 | Gay et al. |
| 5,745,910 A | 4/1998 | Piersol et al. |
| 5,752,055 A | 5/1998 | Redpath et al. |
| 5,752,056 A | 5/1998 | Celik |
| 5,806,078 A | 9/1998 | Hug et al. |
| 5,819,295 A | 10/1998 | Nakagawa et al. |

(Continued)

OTHER PUBLICATIONS

Eisenberg, E., and Gale, D., "Consensus of Subjective Probabilities: The Pari-Mutuel Method," Annals of Mathematical Statistics, 1959, pp. 165-168.*

(Continued)

Primary Examiner—John W Hayes
Assistant Examiner—Nathan Erb
(74) Attorney, Agent, or Firm—Lee & Hayes, PLLC (57) ABSTRACT A concept for providing a process and apparatus for allocating a gamut of assets/resources across a spectrum of consumers is described. The concept includes an apparatus for allocating resources across a spectrum of users. The apparatus includes one or more processors and a memory coupled to the one or more processors. The memory is configured to store data representative of characteristics and capabilities of the resources and describing needs of the spectrum. The memory further includes computer-readable code configured to cause the one or more processors to perform acts of: estimating current requests from the spectrum for the resources; comparing the current requests to the capabilities and characteristics; and allocating the resources with respect to the requests in conformance with a convex program implementation of Arrow-Debreu theory.

8 Claims, 5 Drawing Sheets

U.S. PATENT DOCUMENTS

| | | | |
|---|---|---|---|
| 5,845,058 | A | 12/1998 | Shaw et al. |
| 5,903,903 | A | 5/1999 | Kennedy |
| 5,905,504 | A | 5/1999 | Barkans et al. |
| 5,911,138 | A | 6/1999 | Li et al. |
| 5,920,684 | A | 7/1999 | Hastings et al. |
| 5,940,581 | A | 8/1999 | Lipton |
| 5,950,215 | A | 9/1999 | Tabuchi |
| 5,960,168 | A | 9/1999 | Shaw et al. |
| 5,993,088 | A | 11/1999 | Nogay et al. |
| 6,026,416 | A | 2/2000 | Kanerva et al. |
| 6,070,175 | A | 5/2000 | Mezei |
| 6,094,665 | A | 7/2000 | Lyons et al. |
| 6,134,552 | A | 10/2000 | Fritz et al. |
| 6,138,162 | A | 10/2000 | Pistriotto et al. |
| 6,144,974 | A | 11/2000 | Gartland |
| 6,173,295 | B1 | 1/2001 | Goertz et al. |
| 6,182,080 | B1 | 1/2001 | Clements |
| 6,182,096 | B1 | 1/2001 | Mastie et al. |
| 6,195,676 | B1 | 2/2001 | Spix et al. |
| 6,199,082 | B1 | 3/2001 | Ferrel et al. |
| 6,212,530 | B1 | 4/2001 | Kadlec |
| 6,247,018 | B1 | 6/2001 | Rheaume |
| 6,247,066 | B1 | 6/2001 | Tanaka |
| 6,269,403 | B1 | 7/2001 | Anders |
| 6,344,855 | B1 | 2/2002 | Fisher et al. |
| 6,362,870 | B2 | 3/2002 | Mui et al. |
| 6,385,727 | B1 | 5/2002 | Cassagnol et al. |
| 6,407,821 | B1 | 6/2002 | Hohensee et al. |
| 6,418,448 | B1 | 7/2002 | Sarkar |
| 6,427,230 | B1 | 7/2002 | Goiffon et al. |
| 6,765,584 | B1 | 7/2004 | Wloka et al. |
| 6,941,511 | B1 | 9/2005 | Hind et al. |
| 6,990,654 | B2 | 1/2006 | Carroll, Jr. |
| 7,092,963 | B2 | 8/2006 | Ryan et al. |
| 7,103,625 | B1 | 9/2006 | Hipp et al. |
| 7,359,902 | B2 | 4/2008 | Ornstein et al. |
| 2001/0003828 | A1 | 6/2001 | Peterson et al. |
| 2001/0013043 | A1 | 8/2001 | Wagner |
| 2001/0018697 | A1 | 8/2001 | Kunitake et al. |
| 2001/0043358 | A1 | 11/2001 | Schwartz |
| 2001/0044809 | A1 | 11/2001 | Parasnis et al. |
| 2002/0002667 | A1 | 1/2002 | Kelsey et al. |
| 2002/0049790 | A1 | 4/2002 | Ricker et al. |
| 2002/0065848 | A1 | 5/2002 | Walker et al. |
| 2002/0073236 | A1 | 6/2002 | Helgeson et al. |
| 2002/0085020 | A1 | 7/2002 | Carroll, Jr. |
| 2002/0087602 | A1 | 7/2002 | Masuda et al. |
| 2002/0089691 | A1 | 7/2002 | Fertlitsch et al. |
| 2002/0099797 | A1 | 7/2002 | Merrell et al. |
| 2002/0107886 | A1 | 8/2002 | Gentner et al. |
| 2002/0111133 | A1 | 8/2002 | Wittkotter |
| 2002/0188638 | A1 | 12/2002 | Hamscher |
| 2003/0009672 | A1 | 1/2003 | Goodman |
| 2003/0018694 | A1 | 1/2003 | Chen et al. |
| 2003/0028560 | A1 | 2/2003 | Kudrolli et al. |
| 2003/0050932 | A1 | 3/2003 | Pace et al. |
| 2003/0078829 | A1 | 4/2003 | Chen et al. |
| 2003/0079181 | A1 | 4/2003 | Schumacher et al. |
| 2003/0093520 | A1 | 5/2003 | Beesley |
| 2003/0137539 | A1 | 7/2003 | Dees |
| 2003/0149934 | A1 | 8/2003 | Worden |
| 2003/0158851 | A1 | 8/2003 | Britton et al. |
| 2003/0163552 | A1 | 8/2003 | Savitzky et al. |
| 2003/0163589 | A1 | 8/2003 | Bunce et al. |
| 2003/0167356 | A1 | 9/2003 | Smith et al. |
| 2003/0172168 | A1 | 9/2003 | Mak et al. |
| 2003/0182152 | A1 | 9/2003 | Nakajima et al. |
| 2003/0182311 | A1 | 9/2003 | Nakajima et al. |
| 2003/0182450 | A1 | 9/2003 | Ong et al. |
| 2003/0182656 | A1 | 9/2003 | Leathers et al. |
| 2003/0187534 | A1 | 10/2003 | Suzuki et al. |
| 2003/0187612 | A1 | 10/2003 | Miyake |
| 2003/0187870 | A1 | 10/2003 | Nakajima et al. |
| 2003/0195784 | A1 | 10/2003 | Smith, Jr. |
| 2003/0229845 | A1 | 12/2003 | Salesin et al. |
| 2003/0233420 | A1 | 12/2003 | Stark et al. |
| 2004/0003388 | A1 | 1/2004 | Jacquemot et al. |
| 2004/0003448 | A1 | 1/2004 | Morrow et al. |
| 2004/0021905 | A1 | 2/2004 | Holmstead et al. |
| 2004/0032611 | A1 | 2/2004 | Daly et al. |
| 2004/0034848 | A1 | 2/2004 | Moore et al. |
| 2004/0049737 | A1 | 3/2004 | Simon Hunt et al. |
| 2004/0054669 | A1 | 3/2004 | Seyrat et al. |
| 2004/0061729 | A1 | 4/2004 | Green et al. |
| 2004/0066527 | A1 | 4/2004 | Kloosterman et al. |
| 2004/0078755 | A1 | 4/2004 | Shinjo et al. |
| 2004/0103073 | A1 | 5/2004 | Blake et al. |
| 2004/0111418 | A1 | 6/2004 | Nguyen et al. |
| 2004/0130741 | A1 | 7/2004 | Ferlitsch |
| 2004/0193599 | A1 | 9/2004 | Liu et al. |
| 2004/0230608 | A1 | 11/2004 | Ornstein et al. |
| 2005/0104894 | A1 | 5/2005 | Sanborn et al. |
| 2005/0198069 | A1 | 9/2005 | Cherry et al. |
| 2005/0210227 | A1 | 9/2005 | Emerson et al. |
| 2005/0278240 | A1* | 12/2005 | Delenda ................. 705/37 |

OTHER PUBLICATIONS

"@tryinCSS3 (was Useragent Rules in CSS)"; Mar. 31, 2004; http://lists.w3.org/Archives/Public/www-style/2004Mar/0333.html.; 2 pages.

"[Editorial Draft] Versioning XML Languages"; Proposed TAG Finding Nov. 16, 2003; http://www.w3.org/2001/tag/doc/versioning-20031116; 23 pages.

"Apache Server Frequently Asked Questions"; Apache HTTP Server Version 1.3; http://httpd.apache.org/docs/misc/FAQ.html.; retrieved Apr. 19, 2004; 35 pages.

"Controlling the Data Chaos by Adding Intelligence to Media"; 4 pages. 2004.

"Interleaved Graphics and Text" Bluethman et al., IBM Technical Disclosure Bulletin, Apr. 1980, vol. 22, No. 11., pp. 4813-4815.

"Networked File System"; http://www.scit.wlv.ac.uk/~jphb/comms/nfs.htm.; retrieved Apr. 19, 2004; 6 pages.

"SOAP Version 1.2 Part 1: Messaging Framework"; W3C Proposed Recommendation May 7, 2003; http://www.w3.org/TR/2003/PR-soap12-part1-20030507. 25 pages.

"SVG Print", W3C Working Draft, Jul. 15, 2003 http://www.w3.org/TR/2003/WD-SVGPrint-20030715/ pp. 1-14.

"URIQA! The URI Query Agent Model, A Semantic Web Enabler"; URIQA: The Nokia Query Agent; http://sw.nokia.com/uriqa/URIQA.html.; 9 pages 2004.

"XMP Adding Intelligence to Media"; XMP Specification, Jan. 2004, 11 pages.

"Adobe Photoshop release history", Wikipedia, Oct. 28, 2008, pp. 1-7.

Akerlof, "The Market for "Lemons": Quality Uncertainty and the Market Mechanism", Quarterly Journal of Economics, vol. 84, Issue 3, Aug 1970, pp. 488-500.

Devanur, et al., "An Improved Approximation Scheme for Computing Arrow-Debreu Prices for the Linear Case", retrieved on Nov. 10, 2008 at <<http://www.cc.gatech.edu/~nikhil/pubs/fsttcs.pdf>>, 2003, pp. 1-8.

Geanakoplos, et al., "The Arrow-Debreu Model of General Equilibrium", retrieved on Nov. 10, 2008 at <<cowles.econ.yale.edu>>, Cowles Foundation for Research in Economics at Yale University, 2004.

Girardot et al. "Efficient Representation and Streaming XML Content Over the Internet Medium"; IEEE 2000, pp. 67-70.

Holman; "What is XSL-FO", Google Mar. 20, 2002, pp. 1-4.

Jacobs et al.; "Adaptive Grid-Based Document Layout"; 2003 ACM; pp. 838-847.

Jacobs, et al., "Adaptive Grid-Based Document Layout", ACM, 2003, pp. 838-847.

Jain, et al., "A Polynomial Time Algorithm for Computing an Arrow-Debreu Market Equilibrium for Linear Utilities", Proceedings of the 45th Annual IEEE Symposium on Foundations of Computer Science (FOCS '04), IEEE, 2004, pp. 1-9.

Jain, et al., "Approximating Market Equilibria", Springerlink, LNCS 2764, 2003, pp. 1-11.

Levy, et al., "Non-Distorted Texture Mapping for Sheared Triangulated Meshes", The 25th Conference on Computer Graphics and Interactive Techniques, ACM, 1998, pp. 343-352.

Miller, "An Introduction to the Resource Description Framework", D-Lib Magazine, available at <<http://www.dlib.org/dlib/may98/miller/05miller.html>>, May 1998, 10 pages.

Orchard, David; "Versioning XML Vocabularies" published on XML.com Dec. 3, 2003, pp. 1-10.

Shade, et al., "Layered Depth Images", The 25th Annual Conference on Computer Graphics and Interactive Techniques, ACM, 1998, pp. 231-242.

"Supported File Formats Photoshop Elements 5.0", retrieved at <<http://www.adobe.com/cfusion/knowledgebase/index.cfm?id=330350>>, Sep. 5, 2007, pp. 1-6.

"Versioning XML Languages [Editorial Draft]", Proposed TAG Finding, available at <<http://www.w3.org/2001/tag/doc/versioning-20031116>>, Nov. 16, 2003, 23 pages.

"Windows NT 4.0", Wikipedia, Nov. 6, 2008, pp. 1-9.

"Windows NT Server Printing", retrieved on Nov. 17, 2008 at <<http://www.microsoft.com/resources/documentation/windowsnt/4/server/reskit/en-us/resg...>>, 2008, pp. 1-35.

Ashcraft, et al., "SPOOLES: An Object-Oriented Sparse Matrix Library", retrieved on Jan. 21, 2009 at <<http://citeseerx.ist.psu.edu/viewdoc/summary?doi=10.1.1.44.5809>>, Proceedings of the 9th SIAM Conference on Parallel Processing for Scientific Computing, Mar. 1999, pp. 1-10.

Chien, et al., "Efficient Schemes for Managing Multiversion XML Documents", University of California, California, Dec. 19, 2002, pp. 332-353.

Christodoulakis, et al., "Multimedia Document Presentation, Information Extraction, and Document Formation in MINOS: A Model and a System", ACM Transaction on Office Information Systems, vol. 4, No. 4, Oct. 1986, pp. 345-383.

El-Kwae, et al., "Document Image Representation Using XML Technologies", Proceedings of SPIE, vol. 4670, 2001, pp. 109-120.

Ellis et al., "Postscript, Bezier Curves and Chinese Character", ACM, 1989, pp. 162-165.

Han, et al., "WebSplitter:A Unified XML Framework for Multi-Device Collaborative web browsing" IBM Thomas J. Watson research Centre, Hawthorne, CSCW, Dec. 2-6, 2000, ACM 1-58113-222-0/00/0012, pp. 221-230.

Hardy, et al., "Mapping and Displaying Structural Transformations between XML and PDF", ACM, 2002, pp. 95-102.

Marco, et al., "A Framework for Designing and Implementing the Ada Standard Container Library", ACM 2003, pp. 49-61.

Open eBook Publication Structure 1.2, Open eBook Forum, Aug. 2002, pp. 1-93.

Orchard, et al., "Versioning XML Languages W3C Proposed TAG finding [Editorial Draft]", Nov. 16, 2003, pp. 1-23.

Pawson, "Printing from XML: An Introduction to XSL-FO", Google, Oct. 9, 2002, pp. 1-4.

Peters et al.,"CrystalWeb—A distributed authoring environment for the World-Wide Web" Computer Networks and ISDN Systems, North Holland Publishing. Amsterdam, NL. vol. 27, No. 6, Apr. 1995, pp. 861-870.

Reguero, et al., "Large Scale Print Spool Service", retrieved on Jan. 21, 2009 at <<http://citeseerx.ist.psu.edu/viewdoc/summary?doi=10.1.1.107.7406>>, Proceedings of the Twelfth Systems Administration Conference (LISA 1998), Boston, Massachusetts, Dec. 11, 1998, pp. 1-15.

\* cited by examiner

TIME POLYNOMIAL ARROW-DEBREU MARKET EQUILIBRIUM

RELATED APPLICATIONS

This continuation patent application claims priority to U.S. patent application Ser. No. 10/994,182 to Kamal Jain, filed Nov. 19, 2004, now U.S. Pat. No. 7,584,111 and entitled, "Time Polynomial Arrow-Debreu Market Equilibrium."

TECHNICAL FIELD

This disclosure relates to estimation of demand and supply using a time polynomial implementation of Arrow-Debreu equilibria.

BACKGROUND

As human societies evolved, the efficiencies of division of labor and specialization led to increasingly sophisticated markets and exchange of broader varieties and quantities of goods and services as well as markedly more complex financial tools and products. Barter developed and gradually more general trade systems involving representative or intermediate exchange media evolved. For example, in trade between countries using "soft" currency, such as the former Soviet Union, East Germany and other Eastern block nations, and those of much of the rest of the globe, including Western Europe, a guarantor was often needed to provide "hard" currency backing for the goods, in a process known as avalizing. As a result, not only the balance between demand and supply of goods, but also currency fluctuation rates, as well as geopolitical- and time-varying interest rates, as many other factors generally captured by the terminology "market inefficiencies", entered into determination of a final sales price for the items when they were sold to individual consumers.

Other types of goods also traverse lengthy, and sometimes extremely convoluted, chains of events in a series of locations throughout the world as they are manufactured, distributed etc. Mines in one area provide ores that are shipped to, and then refined in, another area, to provide raw materials. These are then shipped to yet another area for transformation into intermediate products. Those, in turn, are transported to appropriate facilities, where they are further combined with additional intermediate products etc. until a final consumer good or other manufactured item is realized. Such product then enters into a market in yet a still different area. To some extent, this reflects differences in regulatory bodies or prevailing wages. For example, factories known as "maquiladores" line the northern border of Mexico. In these factories, workers perform processes, such as cyanide-based electroplating, that are no longer economically feasible in the United States, due, at least in part, to prevailing wage and regulatory issues.

One facet of planning such diverse production and marketing operations that is a formidable challenge involves determination of appropriate schedules to coordinate fabrication, develop supply lines and achieve a balance so that supply and sales price provide an agreeable confluence satisfactory to sustain production and also consistent with social harmony and a stable economy. In past, this has been addressed primarily via approaches that, in turn, and in combination with other events, have occasionally led to a broad variety of economic disasters of completely phenomenal proportions.

Post-World-War-I Germany is one example of such a catastrophy. Workers were paid twice a day and encouraged to immediately purchase food because inflation was so high that the currency would be worthless otherwise—and large amounts of bank notes were required simply to purchase a loaf of bread. A different type of economic imbalance is seen by examples such as the Brazilian economy in the 1960s, which supported a rate of inflation of over 1,000 per cent per year. The stock market crash of 1929 is another example of a different manifestation of failure to achieve satisfactory span of regulatory control over economic events as they unfolded.

However, even in the absence of such grotesque interruptions or circumstances, the desirability of being able to predict a successful sales price and sales volume for a good or service, or to allocate a gamut of resources of any type, efficiently and across a varying spectrum of demand, has led to much research and lucubration, but in general, has failed to provide satisfactory tools that are robust enough to provide broad generality of effective asset allocation or economic modeling.

A surprisingly rich range of allocation issues might well be responsive to such a tool if one could in fact be developed. A completely different example of resource allocation and planning is observable with telephone services. When a natural disaster such as an earthquake or a volcanic eruption occurs, demand for telephone services experiences an avulsion of titanic proportions. As a result, the entire system fails. Efficient, effective and reliable electrical power distribution is yet another infrastructural resource allocation problem that has recently enjoyed attention in international news. Other types of examples include memory management in computer systems, managing bandwidth and messaging resource allocation for transmission of data bundles of greatly varying size and the like.

Problems in planning range from infrastructural management and development to crop planting, mining, labor supply and other topics might well all be more effectively addressed if a robust, general purpose tool for asset evaluation and allocation could be developed that is consistent with the Arrow-Debrue theorem. Such a tool also provides benefits in other types of asset allocation tasks.

Several centuries of study of such issues, initially under the rubric of moral philosophy, and more recently traveling under the name "economics", has provided numerous insights, tools, modeling methodologies and theories. However, much like the search for the vaunted unified field theory, or a broadly-applicable cure for cancer, development of a robust, general purpose tool for addressing issues of supply and demand in a meaningful and quantifiable fashion has proven elusive, subtle, uninformative and frustrating. At the same time, the world population is increasing, and demand also has increased for a progressively wider collection of technologies, goods and services. A market equilibrium price is a maximum price at which a product can be sold. A fundamental theorem, proven by Arrow and Debrue in 1954, shows that market equilibrium prices always exist under a very general scenario. This proof, however, is not constructive, i.e., it has not heretofore been possible to convert that proof into an efficient algorithm. A large corporation having a gamut of products, and an expectation of increasing both the gamut and their market, could benefit greatly from an automation tool for establishing market equilibrium prices for their products.

There are thus needs that have increased over those of prior decades, and that will continue to increase, for processes and apparatus for efficiently apportioning an ever-growing gamut of raw materials, manufactured goods and other commodities across a market or exchange arena comprising an ever-increasing spectrum of more and more consumers, whilst maintaining harmony.

SUMMARY

In one aspect, the present disclosure describes a process for promoting market liquidity. The process involves determining a spectrum of participants in a market that involves consumers of goods of a particular type. The process also involves defining a gamut of goods of the particular type and including ranges of value units over which respective products related to the gamut command. The process also involves invoking a convex program to determine a particular number of value units for a specific product related to the gamut, at which a market in which the spectrum participates will clear. As a result, a producer of goods is able to automatically adjust sales parameters, such as sales price, to posture the goods at appropriate prices.

In another aspect, the present disclosure describes an apparatus for allocating resources across a spectrum of users. The apparatus stores data descriptive of the resources and describing needs of the spectrum. The apparatus estimates current requests from the spectrum for the resources, compares the current requests to the capabilities and characteristics and allocates the resources with respect to the requests in conformance with a convex program implementation of Arrow-Debrue theory. The apparatus thus automates resource allocation subject to constraints to address needs of the spectrum of users.

In a further aspect, the present disclosure describes a resource allocation engine. The resource allocation engine estimates current requests from a spectrum of participants for resources. The resource allocation engine also characterizes a gamut of resources that can be made available to the participants and allocates portions of the gamut across the spectrum using a convex program implementation of Arrow-Debrue theory. The resource allocation engine provides automated capability for allocation and distribution of resources to the participants.

BRIEF DESCRIPTION

DETAILED DESCRIPTION

The following disclosure describes methods and systems useful in the context of spreading limited resources across a distribution of consumers of those resources, for cases where both linear and non-linear utility functions express utility as a function of consumption of real goods. In subsections I through VII, the disclosure provides mathematical description. The disclosure describes a general context for development of basic concepts. The disclosure also describes a convex program for computing an Arrow-Debreu market equilibrium for the case of linear utilities. As used herein, the term "convex program" refers to a system of convex equations.

A proof is provided to show that a set of assignments at equilibria is convex and the equilibria prices themselves are log-convex. Separate combinatorial characterizations are derived for equilibrium for Arrow-Debreu cases and what are known conventionally in economics as Fisher cases (see, e.g., W. C. Brainard and H. E. Scarf, "How to compute equilibrium prices in 1891", Cowles Foundation Discussion Paper, (1270), 2000). The convex program can be extended for many non-linear utilities, as is described below in more detail.

Convex programs are powerful generalized tools for treating multivariate problems and are an extension of linear mathematical techniques. Convex programs have been applied to problems such as load balancing in electrical power generation, as described in U.S. Pat. No. 6,021,402, entitled "Risk management system for electric utilities" and issued to S. Takriti; electrical circuit design, as described in U.S. Pat. No. 6,269,277, entitled "System and method for designing integrated circuits", issued to M. del M. Hershenson, et al.; integrated circuit mask layout, as described in U.S. Pat. No. 5,633,807, entitled "System and method for generating mask layouts" and issued to J. P. Fishburn et al.; and speech recognition, as described in U.S. Pat. No. 6,374,216, entitled "Penalized maximum likelihood estimation methods, the Baum Welch algorithm and diagonal balancing of symmetric matrices for the training of acoustic models in speech recognition", and issued to C. A. Micchelli et al., among other things. Convex programs are useful in the context of optimization of one economic variable or set of variable subject to a side condition, a problem formulated in one form early in the history of economic studies by Vilfredo Paredo.

The disclosure also makes a powerful theorem (theorem 6.4.1 in M. Grotschel, L. Lovasz, and A. Schrijver, "Geometric Algorithms and Combinatorial Optimization", Second corrected edition, Springer Verlag, Berlin Heidelberg, 1993) even more powerful (theorem 10, infra) in the area of Geometric Algorithms and Combinatorial Optimization. The main idea in this generalization is to allow ellipsoids not to contain the whole convex region but only a part of it.

Environment

Figure 1:
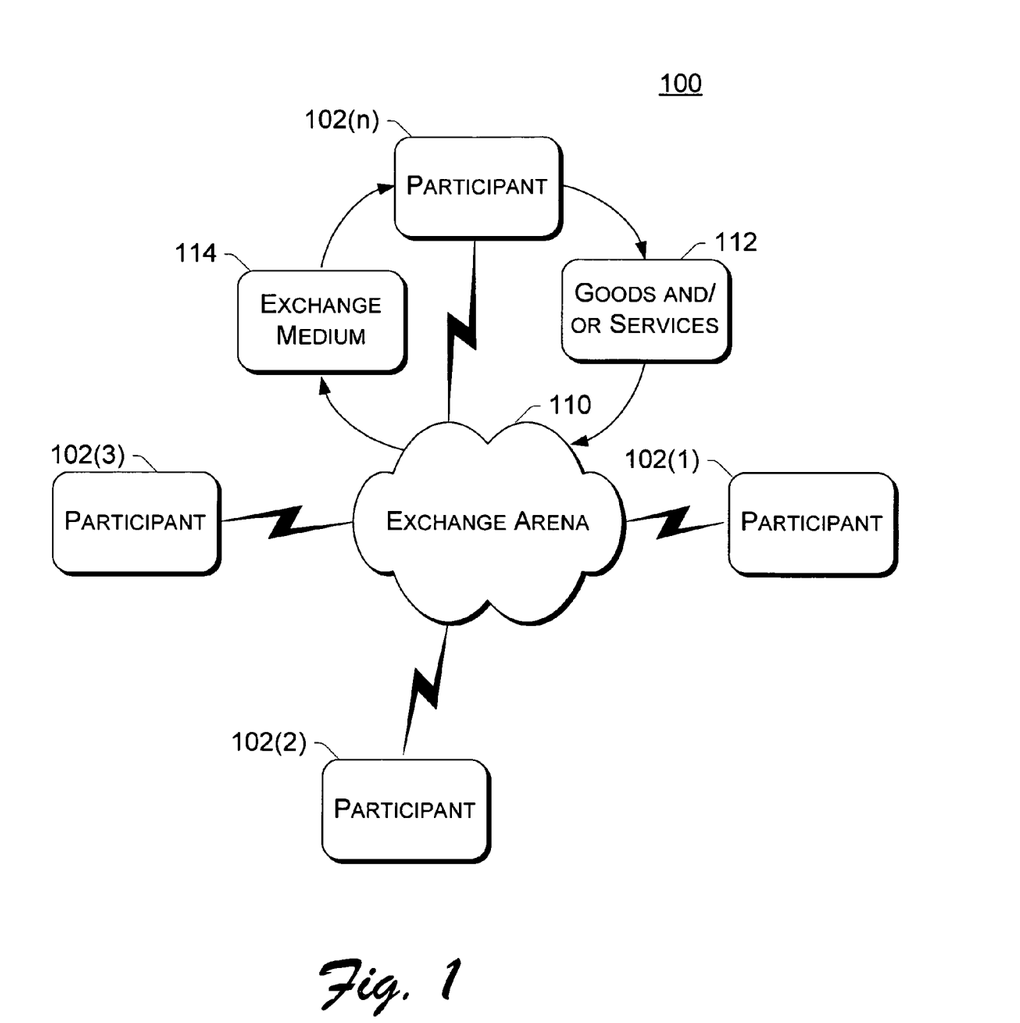
FIG. 1 illustrates an environment in which systems and methods for promoting market liquidity and resource allocation may be established.

FIG. 1 illustrates an environment 100 in which systems and methods for promoting market liquidity and resource allocation may be established. The environment 100 includes n many participants 102(1)-102(n), and exchange arena 110 or market. The participants 102 may be individual consumers, business organizations such as corporations, government entities and the like, or may be users of a data exchange network, a memory system etc. or producers, providers or consumers of goods 112 of any type. The exchange arena 110 may be limited to a particular geopolitical region, or may comprise an exchange arena 110 for goods/services 112 of a particular type. Exchange media 114 comprising value units, which may be money or other types of exchange media, are exchanged for goods 112 by participants 102 in the exchange arena 110.

Each participant 102(1)-102(n) in FIG. 1 is assumed to have some initial endowment of divisible, tangible and/or intangible, assets or services 112, hereinafter referred to collectively as "goods" 112 (the concept of the utility function is classically defined for tangible, real goods 112). For purposes of analysis, it is assumed that each of the n participants 102 offers only one good 112 which is different from the goods which other participants 102 offer. Further, it is assumed that each participant 102 has only one unit of good 112 and also has an associated linear utility function. For an i-th participant 102(i), the utility function is given as $$\sum_j u_{ij} x_{ij},$$

where $x_{ij}$ is the amount of goods 112($j$) consumed by participant 102($i$). To preserve precision in digital computer models, each $u_{ij}$ is defined to be an integer. Each participant 102 seeks to maximize their utility by buying an optimal bundle of goods 112 from other participants 102, using revenue or other exchange media 114 gleaned by selling their own endowment of goods 112.

The classical Arrow-Debreu theorem is described, for example, in K. Arrow and G. Debreu, "Existence of an equilibrium for a competitive economy" (Econometrica, 22:265-290, 1954). This theorem employs a price vector, $(p_1, p_2, \ldots p_n)$, with not all elements p equal to zero, such that exchange can be effectuated at prices p that are set in such a way that the market clears. This price vector then denotes general market equilibrium.

The following assumptions pose no threat to generality. Assume that every participant 102($i$) likes some goods 112($j$), that is, for every i, there is a j, such that $u_{ij} > 0$. If a participant 102 does not like anything, then the price of their goods 112 can be anything and they can be given any bundle of goods 112. Assume also that every good 112($j$) is liked by some participant 102($i$), that is, for every j, there is an i, such that $u_{ij} > 0$. If some good 112 is not liked by any participant 102, then its price must be zero and it thus is irrelevant.

In the next two sections it is assumed that for every proper subset, S, of participants 102 (i.e., neither empty, nor all, participants 102), there is a participant 102($i$), outside S, who likes some good 112($j$) possessed by S, i.e., $u_{ij} > 0$, for some i and some j (this assumption also implies the previous assumption that every participant 102 likes some good 112). This assumption also implies that all the equilibrium prices are non-zero. If not, then consider S as the set of participants 102 having zero priced goods 112. Then some participant 102 outside S will demand infinite quantity of some goods 112 possessed by S. This assumption is not without loss of generality and will be justified infra.

I. A Non-Convex Program Model

In this section, a non-convex program is derived as a tool for subsequent development of the convex models of this disclosure. The non-convex program has all and only general market equilibria as feasible points.

$$\forall j: \sum_i x_{ij} = 1 \qquad \text{Calc. (1A)}$$

$$\forall i, j: x_{ij} \geq 0 \qquad \text{Calc. (1B)}$$

$$\forall i, j: \frac{u_{ij}}{p_j} \leq \frac{\sum_k u_{ik} \cdot x_{ik}}{p_i} \qquad \text{Calc. (1C)}$$

$$\forall i: p_i > 0 \qquad \text{Calc. (1D)}$$

The first two lines, i.e., Calcs. 1A and 1B, of this program mean that $x_{ij}$ are feasible assignments. The third line, i.e., Calc. 1C, means that the goods 112 purchased by an $i^{th}$ participant 102($i$) by spending $p_i$ (which is their revenue) has the highest utility. The fourth line (Calc. 1D) means that the prices ($p_j$) are non-zero. The Arrow-Debreu theorem only guarantees that at least one sales price is non-zero, however, the assumptions above make all prices non-zero. It follows that any general market equilibrium satisfies all of Calcs. 1A through 1D representing this non-convex program. The inverse is also true.

Theorem 1: The feasible region of this non-convex program (Calcs. 1A-1D) has all and only general market equilibria.

Proof. It is clear that all the market equilibria satisfy Calcs. 1A through 1D. Thus, showing that any feasible point is a market equilibrium also demonstrates that all feasible points represent equilibria. Multiplication of both sides of Calc. 1C by $x_{ij} p_i$ yields Calc. 2 below:

$$\forall i, j: u_{ij} x_{ij} \leq \frac{\sum_k u_{ik} x_{ik}}{p_i} x_{ij} p_j \qquad \text{Calc. 2}$$

Summation of Calc. 2 over all j provides Calc. 3 below:

$$\forall i: \sum_j u_{ij} x_{ij} \leq \frac{\sum_k u_{ik} x_{ik}}{p_i} \sum_j x_{ij} p_j \qquad \text{Calc. 3}$$

The assumption that every participant 102 likes some good 112 implies that $$\sum_k u_{ik} x_{ik}$$

is not zero, ergo, Calc. 3 can be simplified to the result in Calc. 4:

$$\forall i: p_i \leq \sum_j x_{ij} p_j \qquad \text{Calc. 4}$$

Summation of Calc. 4 over all i results in Calc. 5:

$$\sum_i p_i \leq \sum_i \sum_j x_{ij} p_j \qquad \text{Calc. 5}$$

Interchanging the order of summation on the right hand side of Calc. 5 leads to Calc. 6:

$$\sum_i p_i \leq \sum_j p_j \sum_i x_{ij} \qquad \text{Calc. 6}$$

The second summation on the right hand side of Calc. 6 is equal to unity. Substituting unity therefor yields obtain Calc. 7:

$$\sum_i p_i \leq \sum_j p_j \qquad \text{Calc. 7}$$

This should have been an equality. Thus, all the inequalities added to obtain Calc. 7 must also have been equalities. This implies two facts, written below as lemmas 2 and 3, to be used later. The theorem follows from lemmas 2 and 3.

Lemma 2: Every feasible point of the non-convex program of Calcs. 1A through 1D satisfies the constraint of money earned equals to money spent for every participant 102, i.e., $$\forall\, i:\ p_i = \sum_j x_{ij} p_j. \qquad \text{Calc. 8}$$

Lemma 3: Every feasible point of the non-convex program of Calcs. 1A through 1D satisfies that the money of every participant 102 is spent optimally i.e., whenever $x_{ij} > 0$, the corresponding constraint on the third line of the program (Calc. 1C) is tight. In the section describing the non-linear utility case, infra (Calc. 17 and associated text, infra), it is shown that this theorem still holds true.

II. Solving the Non-Convex Program

This section describes an example of a convex program useful in several ways for developing faster or more efficient algorithms. The third line (Calc. 1C) of the non-convex program is useful only when $u_{ij} > 0$, i.e., when the goods 112 provide positive utility, and thus Calc. 1C can be rewritten as:

$$\forall\, i, j\ \text{such that } u_{ij} > 0:\ \frac{u_{ij}}{p_j} \le \frac{\sum_k u_{ik} x_{ik}}{p_i}, \qquad \text{Calc. 9}$$

which, in turn, can rewritten as shown in Calc. 10:

$$\forall\, i, j\ \text{such that } u_{ij} > 0:\ \frac{p_i}{p_j} \le \frac{\sum_k u_{ik} x_{ik}}{u_{ij}} \qquad \text{Calc. 10}$$

A directed graph, G, can be constructed with the n participants 102 as the set of vertices. An edge extends from i to j when $u_{ij} > 0$ (i and j may be the same vertex; in that case the edge is a loop). Two kinds of weight are assigned to each edge, ij. The first is denoted by w and the second is denoted by LOGw. For an edge extending from i to j, $$w(ij) = \frac{\sum_k u_{ik} x_{ik}}{u_{ij}}$$

and LOGw(ij)=log(w(ij)). By Farka's lemma, the non-convex program of Calcs. 1A through 1D is feasible if and only if the product that forms $w_{ij}$ is at least one over any cycle of the graph, G, which can be expressing in other words as the following theorem:

Theorem 4: The non-convex program is feasible if and only if there is no negative cycle in G with respect to the weight function, $w_{ij}$.

Proof. The problem of finding an equilibrium assignment is finding those $x_{ij}$'s for which there is a feasible solution of the non-convex program of Calcs. 1A through 1D. Assume a feasible assignment of goods 112 to participants 102, i.e., values for variables $x_{ij}$ satisfying the first two sets of constraints of the non-convex program (i.e., Calcs. 1A and 1B). The objective is to determine existence of a feasible assignment of values to price variables satisfying the last two sets of constraints in non-convex program (i.e., Calcs. 1C and 1D). Since $x_{ij}$s are given, they form the coefficients of a linear program whose variables correspond to prices. Application of Farka's lemma provides conditions on the coefficients (i.e., on assignment variables) which allow a feasible solution to price variables. One way to do is to take the logarithm of the third set of inequalities and assume that the variables are the log(p) and not p. The theorem now easily follows from Farka's lemma. Q.E.D.

This theorem is similar to the "no-negative-cycle" theorem for the classical problem of minimum cost flow. In fact, non-deterministically this has the same functionality also, in that it indicates when an assignment is an equilibrium assignment. A flow represents minimum cost when there is no negative cycle. Similarly, an assignment of goods 112 is an equilibrium solution when there is no negative cycle. This analogy gives a promising hope of a combinatorial algorithm for the general equilibrium problem.

It is demonstrated below that this theorem holds true for concave utility functions as well. Theorem 4 also yields the following convex program for the general equilibrium problem, which also makes it a functional theorem for computational purposes.

$$\forall j: \Sigma_i x_{ij} = 1 \qquad \text{Calc. (11A)}$$

$$\forall i,j: x_{ij} \ge 0 \qquad \text{Calc. (11B)}$$

For every cycle, C, of $G: \Pi_{ij \in C} w(ij) \ge 1$     Calc. (11C)

The separation oracle for the last set of inequalities (Calcs. 11A through 11C) can be derived using an algorithm for finding a negative cycle in a graph. A separation oracle divides a set of solutions into a set of possible solutions and a set of solutions that fail at least one criterion, and also identifies any criteria that violated the constraints. Separation oracles are a conventional way of classifying potential solutions where the calculations for other types of problem-solving would require vastly more computer resources than are available.

Using the inequality that the arithmetic mean is at least the geometric mean, the last set of inequalities (Calcs. 11A through 11C) can also be converted into an infinite number of linear equalities, as is discussed below in more detail. In the following program, α denotes a vector of non-negative real numbers, with the number of co-ordinates being clear from context. A subscripted α denotes a coordinate of α.

$$\forall\, j:\ \sum_i x_{ij} = 1 \qquad \text{Calc. (12A)}$$

$$\forall\, i, j:\ x_{ij} \ge 0 \qquad \text{Calc. (12B)}$$

For every cycle, C, of G and for every α:

$$\frac{1}{|C|} \sum_{ij \in C} \frac{w(ij)}{\alpha_{ij}} \ge \left( \frac{1}{\prod_{ij \in C} \alpha_{ij}} \right)^{\frac{1}{|C|}} \qquad \text{Calc. (12C)}$$

Lemma 5: The convex program of Calcs. 11A through 11C is equivalent to the linear program of Calcs. 12A through 12C.

The third set of inequalities of the linear program of Calcs. 11A through 11C follows from the third set of inequalities of the convex program of Calcs. 12A through 12C, by using the inequality of arithmetic mean and geometric mean. To show equivalency, it is only necessary to show the converse. Assume that one of the inequalities in Calc. 12C of the convex program is violated by an assignment vector x* of $x_{ij}$*. It is shown that x* violates one of the inequalities of the linear program too.

Suppose the inequality corresponding to a cycle C is violated, i.e.:

$$\prod_{ij \in C} w^*(ij) < 1, \quad \text{(Calc. 13)}$$

where w* denotes the value of the weight function at x*. It is claimed that the inequality of the linear program corresponding to the same cycle and $\alpha = w^*$ is violated too. Indeed, the left hand side is one when evaluated at x* whereas the right hand side is bigger than one. This also shows that the convex program of Calcs. 12A through 12C is indeed convex. Q.E.D.

Corollary 6: An ellipsoid algorithm may be employed to find a market equilibrium in polynomial time.

Proof. Eaves (B. C. Eaves, "A Finite algorithm for the linear exchange model", Journal of Mathematical Economics, Vol. 3, Issue 2, July 1976, pages 197-203, hereby incorporated herein by reference) showed that the problem of finding a market equilibrium with linear utilities can be written as a linear complementarity program. This implies that there is a market equilibrium with rational numbers of polynomial sized denominator. Proof follows from theorem 12 or 13. Q.E.D.

Corollary 7: The set of all possible assignments of goods 112 to participants 102 ($x_{ij}$ variables) at corresponding equilibria is convex.

For the purpose of using an ellipsoid algorithm, the linear program of Calcs. 11A through 11C does not offer any advantage over the convex program of Calcs. 12A through 12C. However, a linear program can be useful for designing primal-dual algorithms, and the infinite size of the linear program should not be a concern in designing a primal-dual algorithm. Exponential sized linear programs have been used for designing primal-dual algorithms. A cleverly designed primal-dual algorithm identifies a polynomial number of dual variables to be used.

The convex program of Calcs. 12A through 12C is of exponential size and if it is converted into a linear program then it is of infinite size. So the convex program of Calcs. 12A through 12C is not suitable for developing more efficient interior point methods. In the next section, an example of a new polynomial size convex program is developed which gives a promising hope of developing interior point methods.

III. Convex Program

The third line in the non-convex program of Calcs. 12A through 12C need only be written for only those i's and j's for which $u_{ij} > 0$. This implies that $$\sum_k u_{ik} x_{ik} > 0,$$

and it is known that $p_i$, $p_j > 0$. The logarithm of the whole inequalities then results in Calc. 14:

$$\forall i, j \text{ such that } u_{ij} > 0: \log(p_i) - \log(p_j) \leq \log\left(\frac{\sum_k u_{ik} x_{ik}}{u_{ij}}\right) \quad \text{Calc. 14}$$

Substituting every $\log(p_i)$ with a new variable $\text{LOG}p_i$ provides:

$$\forall i, j \text{ such that } u_{ij} > 0: \text{LOG}p_i - \text{LOG}p_j \leq \log\left(\frac{\sum_k u_{ik} x_k}{u_{ij}}\right) \quad \text{Calc. 15}$$

A logarithm is a concave function, i.e., $$\log\left(\frac{x+y}{2}\right) \geq \frac{\log(x) + \log(y)}{2},$$

which means that if two feasible points satisfy Calc. 15, then their average will also satisfy the inequality. Accordingly, an equivalent convex program for the non-convex program of Calcs. 12A through 12C is:

$$\forall j: \sum_i x_{ij} = 1 \quad \text{Calc. (16A)}$$

$$\forall i, j: x_{ij} \geq 0 \quad \text{Calc. (16B)}$$

$$\forall i, j \text{ such that } u_{ij} > 0:$$

$$\text{LOG}p_i - \text{LOG}p_j \leq \log\left(\frac{\sum_k u_{ik} - x_{ik}}{u_{ij}}\right) \quad \text{Calc. (16C)}$$

Theorem 8: The non-convex program of Calcs. 1A through 1D is equivalent to the convex program of Calcs. 16A through 16C.

Corollary 9: The set of all possible equilibria prices, on a logarithmic scale ($\text{LOG}p_i$), is convex.

IV. General Case

It was assumed above that, for every proper subset, S, of participants 102, there is an $i \notin S$ and a $j \in S$ such that $u_{ij} > 0$. This assumption is not without loss of generality. That assumption is justified below in this section, and it is also demonstrated that, even without this assumption, there is an equilibrium consisting of only non-zero prices. Hence, the convex program of Calcs. 16A through 16C remains valid and provides all such equilibria. Alternative approaches for finding other equilibria where some of the prices are zero are also derived.

Figure 2:
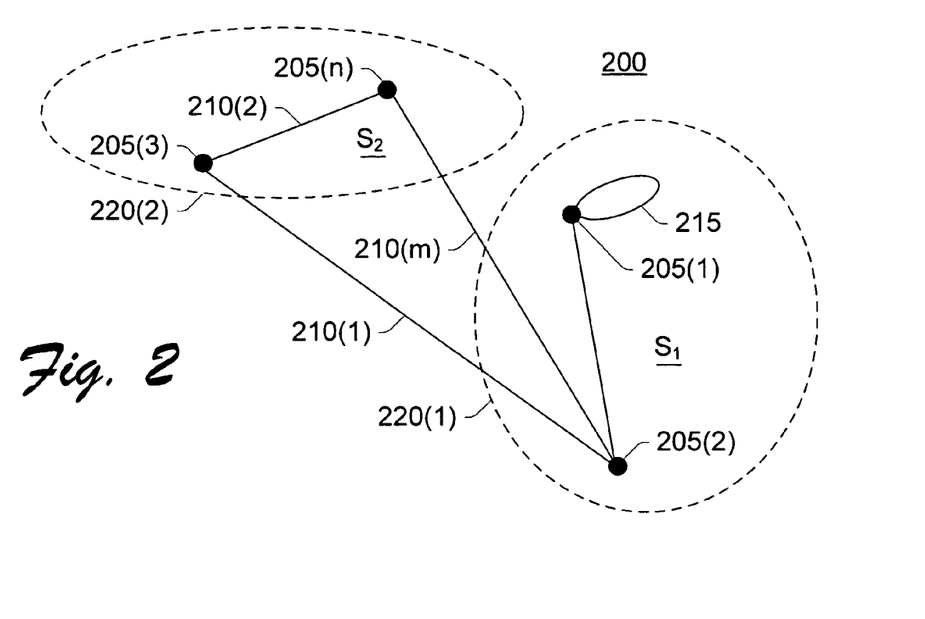
FIG. 2 shows an example of a non-zero liking graph.

A non-zero liking graph may be constructed to describe the problem. FIG. 2 shows an example of such a graph 200. The graph 200 has a node 205 for every participant 102 in the economy 100. There is a directed edge 210 from i to j whenever $u_{ij} > 0$, that is, whenever one participant 102 finds utility in the goods 112 of another participant 102. If i and j are the same, that is, when a participant 102 finds utility in goods 112 that that participant 102 itself produces, then a loop 215 is put on i. When one participant 102 has no use for goods 112 from another participant 102, there is no direct connection 210 between them in the graph 200. If this graph 200 is disconnected, i.e., there is a proper subset S or economy 100, such that there is no edge 210 between S and $\overline{S}$ (S complement), then S and $\bar{S}$ can be considered separate economies 100, and separate convex programs of these two separate economies 100 can be combined together and treated as a convex program for the joint economy 100. Accordingly, the graph 200 can be treated as being connected.

A strongly connected graph 200 satisfies the assumption. Otherwise, the strongly connected component decomposition of the graph 200 is computed by first writing the convex program for the equilibria of each component. For each component, the equilibria prices are all non-zero.

An analysis of the underlying acyclic structure on the strongly connected components follows. A component 220(1), denoted $S_1$, is lower than another component 220(2), denoted $S_2$, if there is an edge from $S_1$ to $S_2$. The transitive closure of this lower relation provides a partial order. When $S_1$ is lower than $S_2$, then $S_2$ is not lower than $S_1$. Hence, if the goods 112 in $S_1$ are non-zero priced, they cannot move from $S_1$ to $S_2$. On the other hand, if goods 112 are heavily priced in $S_2$, they cannot move from $S_2$ to $S_1$ either, and non-zero equilibria are determined for each component. When $S_1$ is lower than $S_2$, prices in $S_2$ are scaled up by a large number so that every participant 102 in $S_1$ likes some good 112 in $S_1$ in comparison with anything in $S_2$. Hence all the prices are non-zero. All such equilibria vectors can be treated using the convex program of Calcs. 16A through 16C.

When zero prices are allowed, only a lower ideal can have a zero price. Any lower ideal can put the zero prices for these cases. For rest of the economy, the convex-program of Calcs. 16A through 16C may be employed. The corollaries in the previous two sections remain valid whenever they are meaningful.

V. Non-Linear Utilities

In this section, the case when the utility functions are non-linear but concave is explored. Assume that the utility functions are differentiable (and if the utility functions are not differentiable than it may be possible to use sub differentials instead of differentials). Let $u_i(x_i)$ be the utility function of i, where $x_i$ is that participant's 102 consumption vector. Assume that $u_i$ is concave, i.e., $$\frac{u_i(x_i) + u_i(y_i)}{2} \leq u_i\left(\frac{x_i + y_i}{2}\right), \quad \text{Calc. 17}$$

for every set of consumption vectors $x_i$ and $y_i$. Let $u_{ij}(x_i)$ represent the partial derivative of $u_i$ at point $x_i$ with respect to the consumption of a $j^{th}$ good 112 (consumption of the $j^{th}$ good 112(j) by an $i^{th}$ participant 102(i) is denoted by $x_{ij}$.). Replacing the $u_{ij}$ in the non-convex program of Calcs. 1A through 1D by $u_{ij}(x_i)$ (where $x_i = (x_{i1}, x_{i2}, \ldots, x_{in})$. For brevity, $u_{ij}(x_i)$ is written as $u_{ij}$, since the argument is understood from context. Now it is shown that the non-convex program of Calcs. 1A through 1D is valid for the non-linear utilities case too.

Theorem 10: The feasible region of the non-convex program of Calcs. 1A through 1D has all and only general market equilibria even if utilities are general differentiable concave functions.

Proof. A price vector is first fixed. At this price, whatever goods 112 a participant 102 can potentially buy is a convex set. However, the participant 102 will be motivated to try to buy that bundle of goods 112 which will maximize their utility. Since the utility function is concave, any local minima will also be a global minima, or more generally, the set of maximum utility bundles is a convex set. The conditions of local minima are straightforward, the marginal utility per unit of additional exchange medium 114 (e.g., money) for all the consumed goods 112 is the same and for other goods 112 it is no bigger.

This time the harder part is proven first, i.e., every feasible solution of the non-convex program of Calcs. 1A through 1D is an equilibrium point. The fact that $u_{ij}$ is constant was not used in proving lemmas 2 and 3. Thus, these lemmas are still valid. Hence the harder side of the theorem follows.

The easier side is proven of the theorem is proven below. In the linear case, the third line constraints, which represented optimally, were obvious. This time we will also have to use an additional fact that the "money earned is equal to money spent" at the equilibrium. For every i, whenever $x_{ij}>0$, marginal utility per unit of money is the same, i.e., for every i, the quantity $$\frac{u_{ij}}{p_j}$$

is the same whenever $x_{ij}>0$. Since $x_{ij}>0$, $$\frac{x_{ij} u_{ij}}{x_{ij} p_j}$$

is the same. By adding the numerator and denominator together and noting that the denominator is $p_i$ via the "money earned equal to money spent" constraint, it is seen that the easier part of the theorem also follows. Q.E.D.

The theorem above shows that the non-convex program of Calcs. 1A through 1D remains valid. The convex program of Calcs. 16A through 16C is still valid also, but it may not always be convex. For some utility functions, e.g., if the utility of the $$i^{j\sqrt{x_{ij}}},$$

then the program of Calcs. 16A through 16C is convex. Another interesting case is if the utility of the $i^{j \log(1+x_{ij})}$, and then, also, the program of Calcs. 16A through 16C is convex. This program is convex for $$\sum_j \frac{x_{ij}}{1 + x_{ij}}$$

as well.

One example where this program is not convex is $$\sum_j (1 - e^{-x_{ij}}).$$

So a natural open question is when the program of Calcs. 16A through 16C is convex.

The answer may include utility functions with weak gross substitutability property. Unlike in the Fisher case, the answer does not include the homogeneous utility function Gjerstad (S. Gjerstad, "Multiple Equilibria in Exchange Economies with Homothetic, Nearly Identical Preference", University of Minnesota, Center for Economic Research, Discussion Paper 288, 1996, hereby incorporated herein by reference). In this paper, Gjerstad gave an example with homogeneous utilities in which the set of market equilibria is not even connected.

The program of Calcs. 16A through 16C simplifies for the Fisher case, which does not require logarithmic functions. It is analogously provable that the following program represented by Calcs. 18A through 18E characterizes equilibria in the Fisher case, even for non-linear utilities. It is convex for linear utilities.

$$\forall j: \sum_i x_{ij} = 1 \quad \text{Calc. (18A)}$$

$$\forall i, j: m_i u_{ij} \leq p_j \sum_k u_{ik} x_{ik} \quad \text{Calc. (18B)}$$

$$\sum_j p_j \leq \sum_i m_i \quad \text{Calc. (18C)}$$

$$\forall i, j: x_{ij} \geq 0 \quad \text{Calc. (18D)}$$

$$\forall j: p_j \geq 0 \quad \text{Calc. (18E)}$$

In Calcs. 18A through 18E, $x_{ij}$ has the same meaning as in the program of Calcs. 16A through 16C. Here, $m_i$ represents the amount of money the $i^{TH}$ participant $102(i)$ has, and $p_j$ is a variable representing the price of a $j^{TH}$ good $112(j)$.

VI. Toward Combinatorial Algorithms

The next section develops an approach for determining an exact price that is useful at least when it is known that there is a solution. This is in contrast to the convex programs of preceding sections that provided approximate prices from available information.

The algorithm in this disclosure is neither combinatorial nor strongly polynomial. As discussed above, algorithms using convex programming have many theoretical advantages. Convex programs provide understanding of the problem by revealing basic structures of the problem. The convex program example of Calcs. 16A through 16C is no different. It also leads to an efficient practical algorithm using interior point methods. As shown in theorem 5, the convex program examples in this disclosure also lead to a combinatorial characterization of the equilibria. This combinatorial characterization is kind of passive. It does not inform one of a solution for a negative cycle in the characterization. However, a negative cycle in a minimum cost flow problem tells us how to decrease the cost of flow.

Such a characterization is possible for the Fisher model using Eisenberg-Gale's methods (as described, for example, in E. Eisenberg and D. Gale "Consensus of subjective probabilities: The pari-mutuel method", Annals of Mathematical Statistics, 30:165-168, 1959). This characterization may lead to development of a strongly polynomial combinatorial algorithm or a strongly polynomial time algorithm for the Fisher model. The following theorem, which is an active characterization of equilibria in the Fisher model, may play a role. This characterization not only identifies when an assignment is not in equilibrium but also provides a solution. To our knowledge there is no other combinatorial characterization known for the equilibria in the Fisher model, which can tell us when an assignment is in equilibria.

Theorem 11: Consider an assignment of $x_{ij}$'s from goods 112 to participants 102 that are buyers. $x_{ij}$ is an equilibrium if and only if there does not exist a good $112(j)$ and two participants $102(i)$ and $102(i')$ who are buyers such that $102(i)$ has a non-zero quantity of good $112(j)$. When participant $102(i)$ gives a sufficiently small but non-zero quantity of good $112(j)$ to participant $102(i')$, the product of $U_i^{m_i} U_{i'}^{m_{i'}}$ increases, where $U_i$ and $U_{i'}$ are the utilities of participants $102(i)$ and $102(i)$ and $m_i$ and $m_{i'}$ are their initial endowments of money.

Proof. The forward direction is immediately implied by the methods developed by Eisenberg-Gale. For the reverse direction, let x be an assignment which is not in equilibrium and let x' be an assignment in equilibrium. As a result, Eisenberg-Gale's objective function is higher at x' than x. For a straight line segment between x and x', with z=x'−x and $\in \in [0,1]$, Eisenberg-Gale's objective function on any point on this line segment is shown below in Calc. 19:

$$\sum_i m_i \log \left( \sum_j u_{ij}(x_{ij} + \varepsilon z_{ij}) \right) \quad \text{Calc. 19}$$

Eisenberg-Gale's objective function is strictly concave, and so its value is strictly higher at positive $\in$ than at $\in=0$. Accordingly, its derivative at $\in=0$ is positive, as is represented below in Calc. 20.

$$\sum_i \frac{m_i \sum_j u_{ij} z_{ij}}{\sum_j u_{ij} x_{ij}} > 0 \quad \text{Calc. 20}$$

Let $$w_{ij} = m_i u_{ij} \Big/ \sum_{j'} u_{ij'} x_{ij'}.$$

The above inequality can then be written as $$w_{ij} = m_i u_{ij} \Big/ \sum_{j'} u_{ij'} x_{ij'}$$

because $w_{ij}$ does not depend upon $$\sum_i \sum_j w_{ij} z_{ij}.$$

A bipartite graph can be constructed with i's on one side and j's on the other. For every $z_{ij}>0$, an edge can be drawn from i to j with (fractional) multiplicity $z_{ij}$. For every $z_{ij}<0$, an edge can be drawn from j to i with (fractional) multiplicity $-z_{ij}$. The bipartite graph is Eulerian on the right hand side, i.e., sum of $z_{ij}$'s on incoming edges to a node is same as the sum of $z_{ij}$'s on outgoing edges from the node. This property implies with a simple inductive proof that the above graph can be decomposed into two graphs with two edges i'j and ji with the same multiplicity. Thus, the weight function, i.e., $$\sum_i \sum_j w_{ij} z_{ij},$$

can be written as a positive combination of the weight functions on these two edge graphs. This implies that there is at least one two edge graph with a positive weight function. One such graph is denoted as i'j and ji, i.e., $w_{i'j} - w_{ij} > 0$. Since $z_{ij}$ is negative, $102(i)$ has some positive quantity of a $j^{TH}$ good $112(j)$. Another assignment is denoted y, which is obtained by x by giving all of $102(i)$'s goods $112(j)$ to i'. For the line segment between x and y, the derivative of Eisenberg-Gale's objective function in the direction of x to y is positive at x. There are two cases.

The first case applies when the derivative remains positive on this line segment. In this case, move to assignment y.

The second case applies when the derivative is zero somewhere on the line segment, say at y'. In that case, move to assignment y'. In both cases, the theorem is proven. Q.E.D.

VII. Generalized Convex Feasibility Testing Algorithm

This section builds on Theorem 6.4.1 in Grotschel (referenced hereinabove) to provide exact prices for goods 112 when it is know that there is a solution and when prices are not sharply varying functions of other variables. Theorem 6.4.1 says: "The strong non-emptiness problem for well-described polyhedra, given by a strong separation oracle, can be solved in oracle-polynomial time." The algorithm developed in this section employs ellipsoid and simultaneous diophantine approximation to lead to a more general approach. Diophantine approximation is a conventional methodology for rounding a set of numbers to reduce and preferably minimize aggregate errors due to rounding. A simple example might be rounding the set of 2.4 and 2.6 to the set of 2 and 3, respectively; the sum of the elements for each set is five and the accuracy and precision of the sum is unchanged by rounding, in this example.

This theorem makes an assumption of well-described polyhedra, which is not true for the convex program infra or for Eisenberg-Gale's convex program. Well-described polyhedra means that any facet of the polyhedra can be encoded with binary encoded length $\phi$, which implies that the coefficients used to describe a facet are rational numbers with binary encoded length $\phi$. This also implies that the corner points of the polyhedra also use rational numbers with binary encoded length polynomial in $\phi$ and n, the dimension of the space. The binary encoded length of a rational number is the sum of the binary encoded lengths of the numerator and the denominator. Proof for the theorem below follows it.

Theorem 12: Given a convex set via a strong separation oracle with a guarantee that the set contains a point with binary encoding length at most $\phi$, a point in the convex set can be found in polynomial time.

Proof. Let P be the given convex set and S be the given strong separation oracle. Let Q be the convex hull of all the points in P with binary encoding length $\phi$. Lemma 6.2.4(b) of Grotschel shows that Q is a well-described polyhedron. With a strong separation oracle for Q, Theorem 6.2.1 of Grotschel may be used to obtain a point of Q, which will also be a point of P. Since S separates any point not in P from P, S also separates any point not in P from Q. The set of points which S fails to separate from Q is P-Q.

Theorem 6.2.1 of Grotschel can be tested by invoking it on incorrect inputs. This can be done by running the algorithm used in the theorem on Q and S. The input is incorrect because S is not a separation oracle for Q. The algorithm will not detect the inconsistency of the input until it tries to separate a point of P-Q from Q. In the present case, a point in P has already been identified, which proves our theorem. The other case is that running the algorithm does not result in trying to separate a point of P-Q from Q. In this case, S works well, and the successful completion of the run is guaranteed by the proof of Theorem 6.2.1 of Grotschel. Q.E.D.

This focuses on a point of polyhedra P not of Q, whereas Theorem 6.2.1 of Grotschel will try to corner Q. An ellipsoid algorithm may lose a part of P, especially at the diophantine approximation step. Also, since the algorithm runs in polynomial time, it finds a solution with binary encoded length $P(n)\phi$, where $P(n)$ is a polynomial. Hence the following theorem follows:

Theorem 13: Given a convex set by a strong separation oracle and a prescribed precision $\phi$, there is an oracle-polynomial time and $\phi$-linear time algorithm which does one of the following:

Concludes that there is no point in the convex set with binary encoded length at most $\phi$.

Produces a point in the convex set with binary encoded length at most $P(n)\phi$, where $P(n)$ is a polynomial. Here, $P(n)$ functions as a sort of approximation factor, which is an artifact of exponential approximation factor in the simultaneous diophantine approximation. Finding an algorithm with $P(n) = 1$, or even any constant, should be a challenging problem.

Resource Allocation Engine

Figure 3:
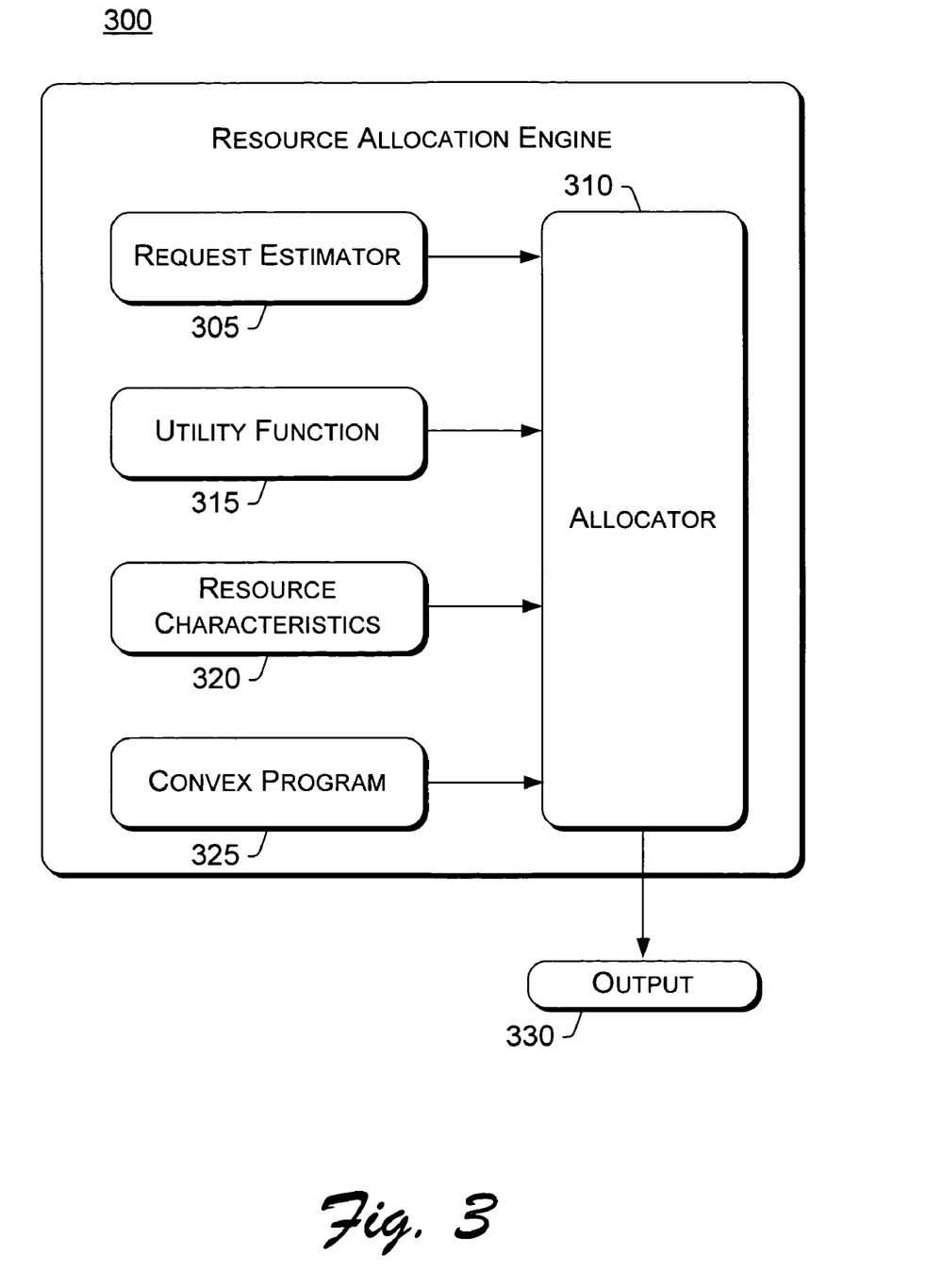
FIG. 3 is a block diagram of a resource allocation engine that may be employed to allocate a gamut of resources across a spectrum of participants, as in the exchange arena of FIG. 1.

FIG. 3 is a block diagram of a resource allocation engine 300 that may be employed to allocate a gamut of resources 112 across a spectrum of participants 102, as in the exchange arena 110 of FIG. 1. The resource allocation engine 300 includes an estimation module or estimator 305 coupled to an allocator 310. The allocator 310 is also coupled to data sources, which may comprise data storage device or may comprise communications media, that access utility functions 315 describing participants 102, resource characteristics 320 providing descriptors of data representative of characteristics and capabilities of goods 112 or resources, and one or more convex programs 325 such as described hereinabove. The resource allocator 310 is also coupled to an output 330.

The estimator 305 estimates current requests from a spectrum of participants 102 for resources or goods 112. The requests collectively describe the needs for resources or goods 112, and, while they may be presented in other formats, they are rendered into suitable form for data processing apparatus to address them.

The resource characteristics 320 describe a gamut of resources or goods 112 that can be made available to the participants 102. In one aspect, the present disclosure contemplates rendering the resource 112 volume being adjustable, e.g., in the context of production schedules, responsive to other variables, such as demand from participants 102, adjusted in accordance with a definition of a suitable market arena 110. In other words, the present disclosure allows for capability for aiding in production planning, i.e., varying productivity in accordance with a modeled estimate of demand at a particular price, and also product deployment.

The allocator 310 invokes an algorithm such as a convex program 325, examples of which are described herein. The allocator 310 accepts inputs from the modules 305, 315 and 320 and operates in accordance with a model such as these convex programs 325 to provide an output 330. The output 330 describes an approach or group of approaches for allocating portions of the gamut across the spectrum using a convex program implementation of Arrow-Debrue theory. In one embodiment, the convex program 325 is configured to employ linear utility functions. In one embodiment, the convex program 325 is configured to employ non-linear utility functions.

The resource allocation engine 300 may comprise one or more processors 504 (FIG. 5, infra), one or more memories such as memory 506 and disc drive 516, coupled to the one or more processors and computer-readable code accessible to the one or more processors. The computer-readable code embodies one or more code modules 534, which, when executed by the one or more processors 504, cause the one or more processors 504 to perform acts of providing at least portions of functionalities of estimating 305, characterizing 320 or allocating 310.

Process

Figure 4:
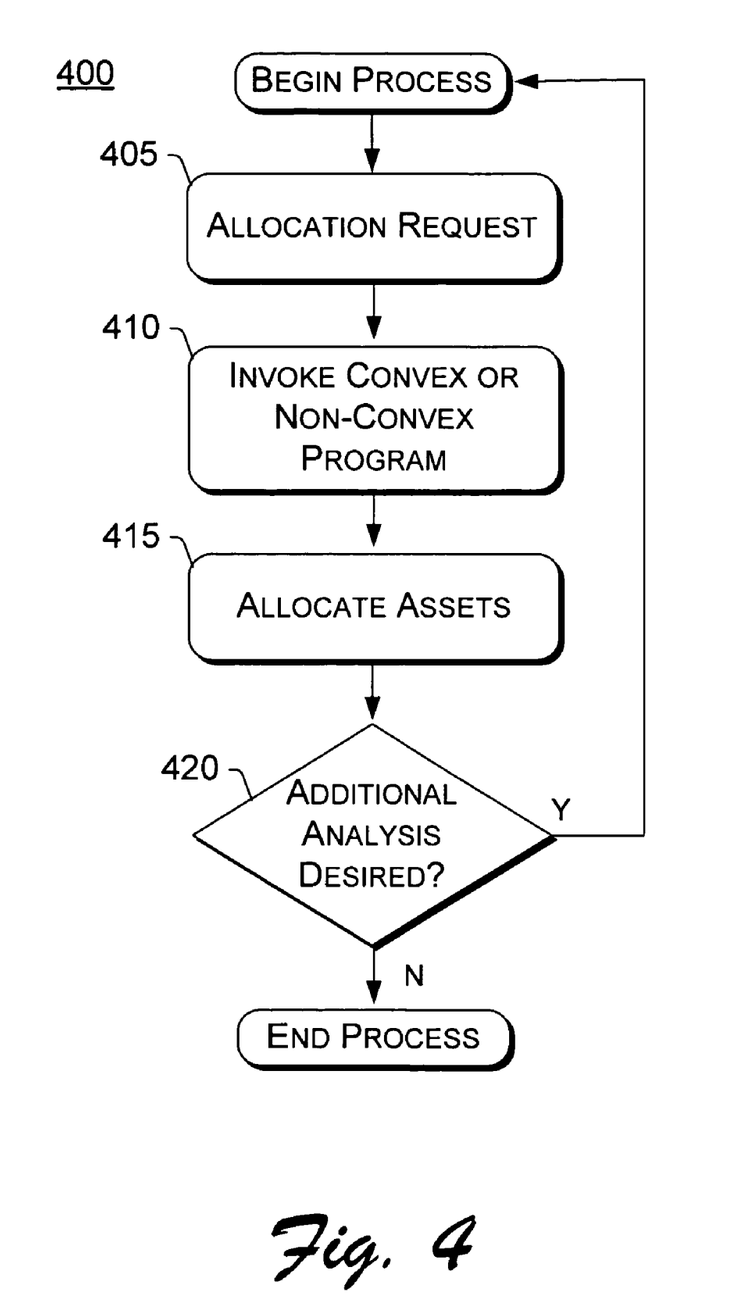
FIG. 4 is a flow chart of a process for resource allocation that finds utility in the environment of FIG. 1, and that may be implemented using the computer resources of FIG. 5.
Figure 5:
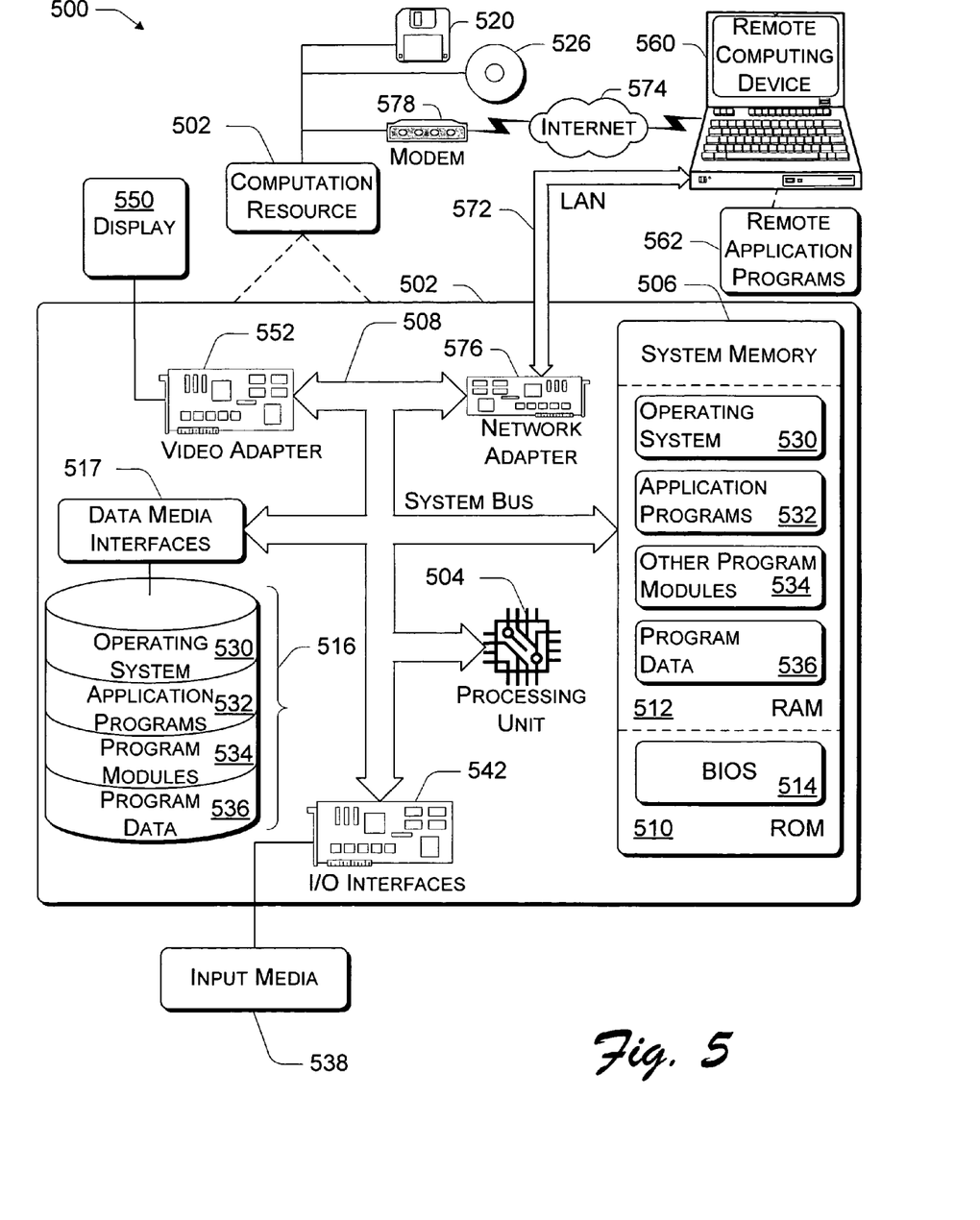
FIG. 5 is a block diagram of a computer system applicable to the context of the environment of FIG. 1 and the disclosure, and which may be used to implement the process of FIG. 4.

FIG. 4 is a flow chart of a process 400 for resource allocation that finds utility in the environment 100 of FIG. 1, and that may be implemented as the resource allocation engine 300 of FIG. 3, for example, via the computer resources 500 of FIG. 5. The other program modules 534 of FIG. 5 may comprise computer-readable code that may be executed by one or more processors 504 to provide various functions of the resource allocation engine 300, for example.

The process 400 begins with a request (block 405) for asset allocation in an appropriate context, such as $S_1$ of FIG. 2. The request may come from a communications system controller, from a business wishing to price goods 112 in a particular exchange arena (e.g., academic community, specific country, specific business arena etc.). The asset allocation may involve market phenomena, such as determining a price in light of market factors, or may involve spectrum/bandwidth and other aspects of allocation of a data transmission medium etc.

In a block 410, the process 400 invokes a model such as the convex or non-convex programs described above, or the combinatorial approach. The convex programs provide approximations, while the approach using the diophantine approximations can provide an exact solution when prices, for example, are not sharply sensitive.

In a block 415, the process 400 provides data descriptive of asset allocation in the context of the set $S_1$. The data may relate to memory resource allocation, communications or other infrastructural system management or determination of market prices consonant with clearing the associated market.

In a query task 420, the process 400 determines when an additional set, such as set S2 of FIG. 2, should be analyzed. When the query task 420 determines that another set should be analyzed, control passes back to the block 405, and the process 400 iterates. As noted above with respect to FIG. 2, convex programs for each of the sets S1 and S2 can then be combined to provide an overall solution. When the query task 420 determines that no additional analysis is desired, the process 400 then ends.

Computer System

FIG. 5 illustrates an example of general computer resources 500 applicable to the context of the environment 100 of FIG. 1 and the disclosure, and which may be used to implement the process 400 of FIG. 4. These computer resources 500 may comprise a resource allocation engine 300 that includes computer-readable code that causes the resource allocation engine 300 to employ the programs of the types discussed above in order to allocate a gamut of resources across a spectrum of participants. The illustrated operating environment is only one example of a suitable operating environment and is not intended to suggest any limitation as to the scope of use or functionality of the embodiments of this disclosure. Other well-known computing systems, environments, and/or configurations may be suitable for implementation of the disclosure.

The present disclosure is provided in part in the general context of computer-executable instructions, such as program modules, executed by one or more computers or other devices. Generally, program modules include routines, programs, objects, components, data structures etc. that perform particular tasks or implement particular abstract data types. Typically the functionality of the program modules may be combined or distributed as desired in various embodiments.

The concepts disclosed herein may be implemented in hardware or a combination of hardware, software, and/or firmware. For example, one or more application specific integrated circuits (ASICs) could be designed or programmed to embody the concepts disclosed herein.

FIG. 5 depicts a general example of a computation resource 502 that can be used to implement the processes described herein. The computation resource 502 is shown as an example of a computer in which various embodiments of these processes can be practiced. The computation resource 502 is illustrated as only an example of a computing device that may be used with the invention; other devices may alternatively used that include more components or alternatively fewer components than those illustrated in FIG. 5.

The computation resource 502 includes one or more processors or processing units 504, a system memory 506, and a bus 508 that couples various system components including the system memory 506 to processor(s) 504. The bus 508 represents one or more of any of several types of bus structures, including a memory bus or memory controller, a peripheral bus, an accelerated graphics port and a processor or local bus using any of a variety of bus architectures. The system memory 506 includes nonvolatile read only memory (ROM) 510 and random access memory (RAM) 512, which may or may not be a volatile memory, and which comprise examples of articles of manufacture configured to embody computer-readable instructions for purpose of causing one or more processors 504 to execute functions in accordance with those instructions. A basic input/output system (BIOS) 514, containing the basic routines that help to transfer information between elements within computation resource 502, such as during start-up, is stored in ROM 510.

The computation resource 502 further may include a hard disk drive 516 for reading from and writing to a hard disk, not shown, coupled to bus 508 via a data media interface 517 (e.g., a SCSI, ATA, or other type of interface); a magnetic disk drive (not shown) for reading from and writing to a removable magnetic disk 520 and an optical disk drive (not shown) for reading from and/or writing to a removable optical disk 526 such as a compact disc or CD, DVD, or other optical media. The hard disk drive 516, magnetic disk drive and/or optical disk drive are each coupled to the system bus 508 by one or more data media interfaces 517.

The drives and their associated computer-readable media provide nonvolatile storage of computer-readable instructions, data structures, program modules and other data for the computation resource 502.

Although the exemplary environment is described herein as employing a hard disk drive 516, a removable magnetic disk 520 and a removable optical disk 526, it will be appreciated by those skilled in the art that other types of computer-readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk drive 516, magnetic disk 520, optical disk 526, ROM 510, or RAM 512, including an operating system 530, one or more application programs 532, other program modules 534 and program data 536. A user may enter commands and information into computation resource 502 through input devices such as input media 538 (e.g., keyboard/keypad, tactile input or pointing device, joystick, touchscreen or touchpad, microphone, antenna etc.). Such input devices 538 are coupled to the processing unit 504 through an input/output interface 542 that is coupled to the system bus (e.g., a serial port interface, a parallel port interface, a universal serial bus (USB) interface, an IEEE 1354 (Firewire) interface, etc.). A monitor 550 or other type of display device is also coupled to the system bus 508 via an interface, such as a video adapter 552.

The computation resource 502 may include capability for operating in a networked environment using logical connections to one or more remote computers, such as a remote computer 560. The remote computer 560 may be a personal computer, a server, a router, a network PC, a peer device or other common network node, and typically includes many or all of the elements described above relative to the computation resource 502. In a networked environment, such as that illustrated with computing environment 500, program modules depicted relative to the computation resource 502, or portions thereof, may be stored in a remote memory storage device. By way of example, remote application programs 562 reside on a memory device of the remote computer 560. The logical connections represented in FIG. 5 may include a local area network (LAN) 572 and/or a wide area network (WAN) 574.

Such networking environments are commonplace in modern computer networks, and in association with intranets and the Internet. In certain embodiments, the computation resource 502 executes an Internet Web browser program (which may optionally be integrated into the operating system 530) such as the "Internet Explorer" Web browser manufactured and distributed by Microsoft Corporation of Redmond, Wash.

When used in a LAN networking environment, the computation resource 502 is coupled to a network such as the local area network 572 through a network interface or adapter 576. When used in a WAN networking environment, the computation resource 502 typically includes interfaces such as a modem 578, such as a broad band or cable modem, or other means for establishing communications over the wide area network 574, such as the Internet. The modem 578, which may be internal or external, is typically coupled to the system bus 508 via a serial port interface. In a networked environment, program modules depicted relative to the computation resource 502, or portions thereof, may be stored in the remote memory storage device. It will be appreciated that the network connections shown are exemplary and other means of establishing a communications link between the computers may be used.

The computation resource 502 typically includes at least some form of computer-readable media. Computer-readable media can be any available media that can be accessed by the computation resource 502. By way of example, and not limitation, computer-readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by the computation resource 502.

Communication media typically embodies computer readable instructions, data structures, program modules or other data embodied in a modulated data signal such as a carrier wave or other transport mechanism and includes any information delivery media. The term "modulated data signal" means a signal that has one or more of its characteristics set or changed in such a manner as to encode information in the signal.

By way of example, and not limitation, communication media includes wired media such as wired network or direct-wired connection, and wireless media such as acoustic, RF, infrared and other wireless media. Combinations of any of the above should also be included within the scope of computer readable media.

Conclusion

Although the description above uses language that is specific to structural features, data organizational and/or storage schemata and/or methodological acts, it is to be understood that the recitation of the appended claims is not limited to the specific features or acts described. For example, it will be appreciated that the data handling concepts described herein are not limited to any specific data transmission protocol, rather, these data handling concepts may be implemented within a broad range of message/content exchange techniques. It will be appreciated that the specific features and acts are disclosed as exemplary forms of implementing these concepts.

What is claimed is:

1. A tangible computer-readable storage medium for deriving a combinatorial characterization of an equilibrium in an exchange arena, wherein first and second participants in the exchange, each participant has a utility function representing consumption of goods, the money and goods are exchange, and an allocation of a gamut of resources at the equilibrium maximizes a mathematical product of the utility functions, the tangible computer-readable storage medium storing computer-executable instructions for causing a computer to perform the steps comprising:

selecting a first test point in a convex set, wherein each point in the convex set describes a respective allocation of resources and the first test point has an associated Eisenberg-Gale objective function, and wherein the derivative of the Eisenberg-Gale objective function at the first test point is positive;

selecting a second test point in the convex set, wherein the second test point represents an allocation of resources associated with a transfer of all of the first participant's goods to the second participant;

on a line from the first test point to the second test point, calculating the derivative of the Eisenberg-Gale objective function from the first test point in the direction of the second test point, wherein the derivative is positive at the first test point;

if the derivative remains positive along the line from the first test point to the second test point, then indicating the allocation of resources represented by the second test point; and if the derivative equals zero somewhere on the line from the first test point to the second test point, thereby representing the equilibrium, then indicating the allocation of resources represented by the point on the line from the first test point to the second test point where the derivative equals zero;

wherein the Eisenberg-Gale objective function is represented as:

$$\sum_i m_i \log\left(\sum_j u_{ij}(x_{ij} + \varepsilon z_{ij})\right)$$

wherein i represents the $i^{th}$ participant; j represents the $j^{th}$ good; $m_j$ represents the initial amounts of money of the i participants; $u_{ij}$ represents the utility functions of the i participants with respect to the j goods: and $z_{ij}$ represents $(x_{ij}'-x_{ij})$ where $x_{ij}'$ represents an assignment in equilibrium of good j with respect to participant i, and $x_{ij}$ represents an assignment not in equilibrium of good j with respect to participant i; such that goods are transferred from the first participant to the second participant, at least some goods are transferred from the second participant to the first participant in exchange, and $\in$ represents a positive constant.

2. The tangible computer-readable storage medium as recited in claim 1, wherein the exchange arena comprises a goods market, and the equilibrium is represented by a Fisher model.

3. The tangible computer-readable storage medium as recited in claim 1, wherein the exchange arena represents a data network for transferring digital data of varying sizes via a transmission system that possesses finite resources, and the equilibrium corresponds to an equilibrium allocation of the resources across a spectrum of users originating the digital data.

4. An apparatus for allocating a gamut of resources across a spectrum of users in an exchange arena, wherein the users each have an initial amount of money and goods to exchange, each user has a utility function representing consumption of goods, and the money and goods are exchanged, comprising:
   at least one processor; and
   a memory coupled to the processor, wherein the memory stores data representing the resources and multiple needs of the spectrum of the users, and the memory further includes computer-readable instructions capable of causing the processor to perform the steps comprising:
   estimating current requests from the spectrum of the users for the resources;
   comparing the current requests to the data; and
   allocating the resources with respect to the current requests according to a combinatorial characterization of an equilibrium in the exchange arena, wherein the combinatorial characterization determines when an assignment of the resources between the users provides, in response to allocating the resources, an increase in a product of utility functions associated respectively with the users, wherein the allocating includes:
   selecting a first test point in a convex set describing a plurality of assignments, wherein the first test point has an associated Eisenberg-Gale objective function, and wherein the derivative of the Eisenberg-Gale objective function at the first test point is positive;
   locating a second point in the convex set, wherein the second point represents an exchange of all the money and goods between the users;
   testing the derivative of the Eisenberg-Gale objective function at the first test point to determine when the derivative is positive along a line from the first test point to the second point;
   if the derivative remains positive along the line from the first test point to the second point, then indicating the assignment represented by the second point; and
   if the derivative for at least one point along a length of the line from the first test point to the second point is not positive, then finding a third point along the line from the first test point to the second point at which the derivative has a value of zero, representing the equilibrium, and indicating the assignment represented by the third point;
   wherein the Eisenberg-Gale objective function is represented as:

$$\sum_i m_i \log\left(\sum_j u_{ij}(x_{ij} + \varepsilon z_{ij})\right)$$

wherein i represents the $i^{th}$ user; j represents the $j^{th}$ good; $m_j$ represents the initial amounts of money of the i users; $u_{ij}$ represents the utility functions of the i users with respect to the j goods; and $z_{ij}$ represents $(x_{ij}'-x_{ij})$ where $x_{ij}'$ represents an assignment in equilibrium of good j with respect to user i, and $x_{ij}$ represents an assignment not in equilibrium of good j with respect to user i; such that $\in$ represents a positive constant.

5. The apparatus of claim 4, wherein the users provide requests to transfer digital data of different data sizes via a data transfer network, and the resources comprise data transfer capabilities.

6. The apparatus of claim 4, wherein the users provide requests to store data of different data sizes in some particular memory, and the resources comprise memory resources.

7. The apparatus of claim 4, wherein the users provide requests to transmit information of different sizes via an information system, and the resources comprise information system descriptors.

8. The apparatus of claim 4, wherein the users provide requests to transmit bodies of information of different data sizes via a data transmission system, each of the bodies representing one or more digital representations of text, video, image or audio, and the resources comprise data transmission system descriptors, including one of: bandwidth, capacity, load, or throughput.

* * * * *